(12) United States Patent
Seto et al.

(10) Patent No.: US 7,353,923 B2
(45) Date of Patent: Apr. 8, 2008

(54) DAMPER DEVICE

(75) Inventors: Yasuhiko Seto, Odawara (JP); Masayuki Nishiyama, Chigasaki (JP)

(73) Assignee: NIFCO Inc., Yokohama (JP)

( * ) Notice: Subject to any disclaimer, the term of this patent is extended or adjusted under 35 U.S.C. 154(b) by 548 days.

(21) Appl. No.: 10/981,597

(22) Filed: Nov. 5, 2004

(65) Prior Publication Data
US 2005/0139691 A1    Jun. 30, 2005

(30) Foreign Application Priority Data

Nov. 7, 2003   (JP)   ............................. 2003-378982
Nov. 7, 2003   (JP)   ............................. 2003-378983

(51) Int. Cl.
*F16K 9/14*   (2006.01)

(52) U.S. Cl. .................................................... 188/290

(58) Field of Classification Search ........ 188/290–296, 188/306, 307, 322.5; 16/51, 52, 76
See application file for complete search history.

(56) References Cited

U.S. PATENT DOCUMENTS 2,133,614 A * 10/1938 Gardiner ........................ 16/58
4,825,503 A * 5/1989 Shiramasa et al. ............. 16/52
6,725,984 B2 * 4/2004 Orita .......................... 188/290
7,066,308 B2 * 6/2006 Kanno et al. ................ 188/290

FOREIGN PATENT DOCUMENTS

| EP | 0 458 454 | 11/1991 |
| GB | 2 245 026 | 12/1991 |
| GB | 2 245 311 | 1/1992 |
| GB | 2 246 185 | 1/1992 |
| JP | 04-282039 | 10/1992 |

* cited by examiner

*Primary Examiner*—Chris Schwartz
(74) *Attorney, Agent, or Firm*—Manabu Kanesaka

(57) ABSTRACT

A damper device includes a housing; a viscous fluid filled inside the housing; a rotor rotatably disposed inside the housing; and a sealing member for preventing the viscous fluid from leaking through the rotor and the housing. A rotational wing with a viscous-fluid passage is provided on one of the housing and the rotor. The rotational wing moves relative to the viscous fluid in a circumferential direction, and extends in a radial direction for dividing a housing portion of the housing filled with the viscous fluid. A valve is provided on the rotational wing, and is formed of an elastic member capable of deforming elastically. The valve opens the viscous-fluid passage when the rotor rotates in one direction, and blocks the viscous-fluid passage when the rotor rotates in the other direction.

11 Claims, 12 Drawing Sheets

DAMPER DEVICE

BACKGROUND OF THE INVENTION AND RELATED ART STATEMENT

The present invention relates to a damper device with a one-way function for damping, for example, a rotation of a door in an opening direction and not damping the rotation of the door in a closing direction.

A damper device is generally composed of a housing; viscous fluid filled inside the housing; a rotor rotatably disposed inside the housing and including an axis portion with one part projecting from the housing; and a sealing member for preventing the viscous fluid from leaking through the axis portion of the rotor and the housing. The rotor is provided with a projecting portion having a fluid passage and projecting in an axial direction thereof. A valve is provided on the projecting portion. The valve includes a first fluid passage for reducing a flow of the viscous fluid into the fluid passage of the projecting portion when the rotor rotates in one direction, and a second fluid passage for increasing the flow of the viscous fluid into the fluid passage of the projecting portion when the rotor rotates in the other direction.

Patent Reference: Japanese Patent No. 2581655

In the damper device described above, the valve is disposed to be movable and rotatable. Accordingly, the viscous fluid passes through a gap between the valve and the housing. As a result, it is difficult to obtain a desired braking torque with certain accuracy. Also, the valve receives a large load, thereby causing damage and lowering durability.

In view of the problems described above, an object of the present invention is to provide a damper device capable of generating a braking torque with certain accuracy, and reducing a load on a valve, thereby improving durability.

Further objects and advantages of the invention will be apparent from the following description of the invention.

SUMMARY OF INVENTION

In order to attain the objects described above, according to the present invention, a damper device includes a housing; a viscous fluid filled inside the housing; a rotor rotatably disposed inside the housing; and a sealing member for preventing the viscous fluid from leaking through the rotor and the housing. A rotational wing or rotational wing device with a viscous-fluid passage is provided on one of the housing and the rotor. The rotational wing moves relative to the viscous fluid in a circumferential direction, and extends in a radial direction for dividing a housing portion of the housing filled with the viscous fluid. A valve or valve device may be provided on the rotational wing, and is formed of an elastic member capable of deforming elastically. The valve opens the viscous-fluid passage when the rotor rotates in one direction, and blocks the viscous-fluid passage when the rotor rotates in the other direction.

According to the present invention, the valve may elastically contact at least an inner face of the housing. The viscous fluid may be formed of silicone oil, and the valve is formed of ethylene-propylene-diene rubber having a non-swelling property relative to the silicone oil.

According to the present invention, a damper device includes a housing; a viscous fluid filled inside the housing; a rotor rotatably disposed inside the housing; and a sealing member for preventing the viscous fluid from leaking through the rotor and the housing. A rotational wing with a viscous-fluid passage is provided on one of the housing and the rotor. The rotational wing moves relative to the viscous fluid in a circumferential direction, and extends in a radial direction for dividing a housing portion of the housing filled with the viscous fluid in the circumferential direction. A valve is provided on the rotational wing for opening the viscous-fluid passage when the rotor rotates in one direction and blocking the viscous-fluid passage when the rotor rotates in the other direction. A wall portion projecting in an axial direction of the rotor is provided on the housing. A passage is formed between a surface of the wall portion having an orthogonal surface perpendicular to a rotational axis line of the rotor and a surface of the rotor having an orthogonal surface perpendicular to the rotational axis line and facing the surface of the wall portion for passing the viscous fluid therethrough.

In the present invention, the rotational wing with the viscous-fluid passage is provided on one of the housing and the rotor. The rotational wing moves relative to the viscous fluid in the circumferential direction, and extends in a radial direction for dividing the housing portion of the housing filled with the viscous fluid. The valve is provided on the rotational wing, and is formed of the elastic member capable of deforming elastically. The valve opens the viscous-fluid passage when the rotor rotates in one direction, and blocks the viscous-fluid passage when the rotor rotates in the other direction. Accordingly, the valve reliably blocks the viscous-fluid passage when a braking torque is generated. As a result, the viscous fluid passes only through a specific passage, thereby obtaining the braking torque with high accuracy.

The valve is formed of the elastic member capable of deforming elastically, thereby improving durability of the valve and the damper device. The valve elastically contacts at least the inner face of the housing. Accordingly, the viscous fluid passes only through a specific passage, thereby obtaining the braking torque with high accuracy. Moreover, the viscous fluid is formed of silicone oil, and the valve is formed of ethylene-propylene-diene rubber with a non-swelling property relative to the silicone oil. Accordingly, it is possible to eliminate damage on the valve due to a temperature change, thereby making it possible to use the damper device in cold climate without damage.

In the present invention, the rotational wing with the viscous-fluid passage is provided on one of the housing and the rotor. The rotational wing moves relative to the viscous fluid in the circumferential direction, and extends in the radial direction for dividing the housing portion of the housing filled with the viscous fluid. The valve is provided on the rotational wing for opening the viscous-fluid passage when the rotor rotates in one direction and blocking the viscous-fluid passage when the rotor rotates in the other direction. The wall portion projecting in the axial direction of the rotor is provided on the housing. The passage is formed between the surface of the wall portion having the orthogonal surface perpendicular to the rotational axis line of the rotor and the surface of the rotor having the orthogonal surface perpendicular to the rotational axis line and facing the surface of the wall portion for passing the viscous fluid therethrough. When the braking torque is generated, the passage expands due to a pressure of the viscous fluid passing through the passage. With the structure described above, it is possible to maintain a gap of the passage constant through rigidity of the housing, thereby obtaining the braking torque with high accuracy. Also, the members forming the passage have rigidity, thereby improving durability of the damper device.

According to the invention, the rotational wing device may include a first rotational wing with a first viscous-fluid passage provided on one of the housing and the rotor, and a second rotational wing with a second viscous-fluid passage provided on the other of the housing and the rotor. Also, the valve device may include a first valve provided on the first rotational wing for opening and closing the first viscous-fluid passage, and a second valve provided on the second rotational wing for opening and closing the second viscous-fluid passage.

DETAILED DESCRIPTION OF PREFERRED EMBODIMENTS

Figure 1:
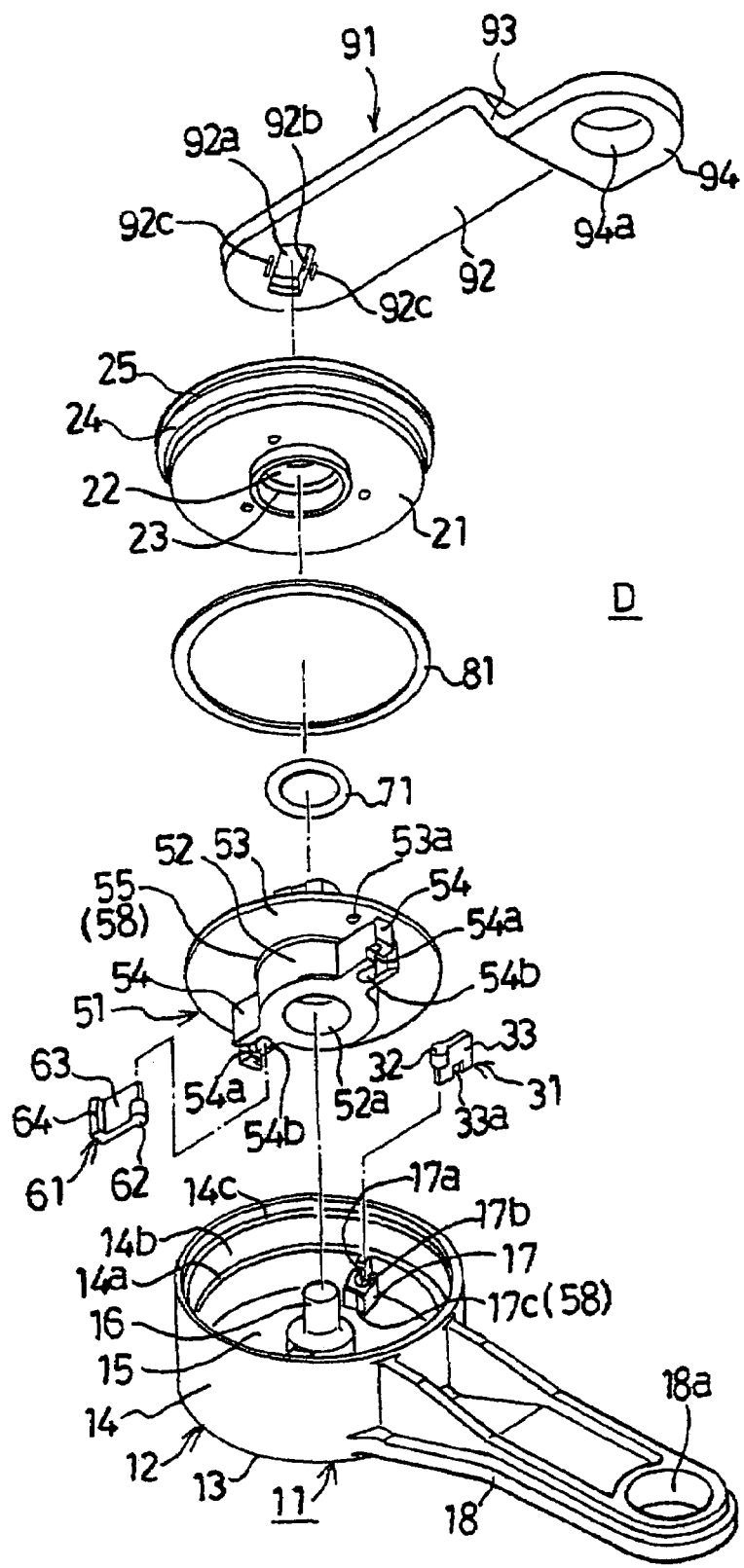
FIG. 1 is an exploded perspective view of a damper device according to a first embodiment of the present invention.

Hereunder, embodiments of the present invention will be described with reference to the accompanying drawings. FIG. 1 is an exploded perspective view of a damper device according to an embodiment of the present invention.

As shown in FIG. 1, a damper device D is composed of: a case 11 made of a synthetic resin such as polycarbonate having rigidity; a cap 21 made of a synthetic resin such as polycarbonate having rigidity for blocking an opening of the case 11; second valves 31 made of a synthetic resin such as polyacetal and attached to each second rotational wing 17 formed on a bottom of the case 11; a silicone oil 41 as viscous fluid filled inside the case 11 (housing portion 15) closed by the cap 21; a rotor 51 made of a synthetic resin such as polyacetal and having an axis portion 52 rotatably disposed inside the case 11 with one part projecting outside from a penetrating hole 22 of the cap 21; first valves 61 made of a material such as ethylene-propylene-diene rubber having elasticity and non-swelling property relative to the silicone oil 41, and attached to first rotational wings 54 provided in the rotor 51; an O-ring 71 as a sealing member for preventing the silicone oil 41 from leaking between the cap 21 and the rotor 51 and made of a material such as a self-lubricating silicone rubber; a ring-shaped sheet 81 made of a synthetic resin and disposed between the cap 21 and the flange portion 53 of the rotor 51, and having an outer circumferential diameter slightly smaller than an outer circumferential diameter of a flange portion 53 of the rotor 51; and an arm 91 made of a synthetic resin such as polyacetal having rigidity and attached to the axis portion 52 of the rotor 51 projecting from the cap 21. A housing is composed of the case 11 and the cap 21.

Figure 2:
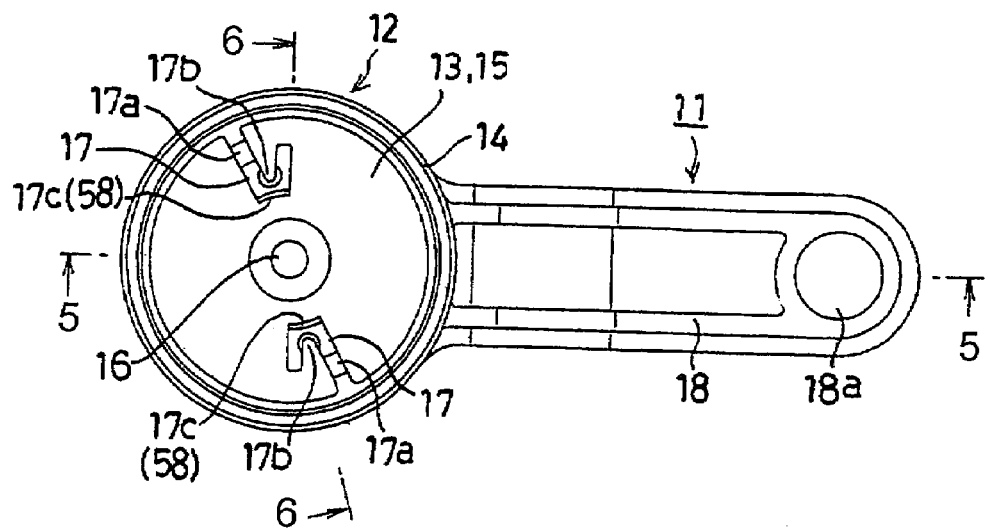
FIG. 2 is a plan view of a case shown in FIG. 1.
Figure 3:
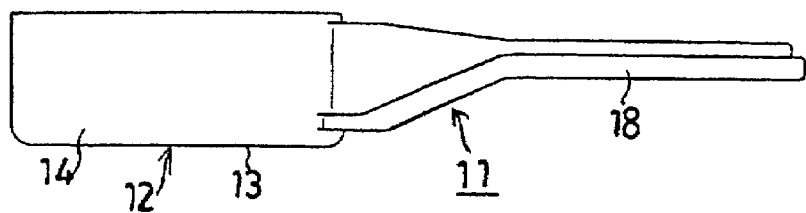
FIG. 3 is a front view of the case shown in FIG. 2.
Figure 4:
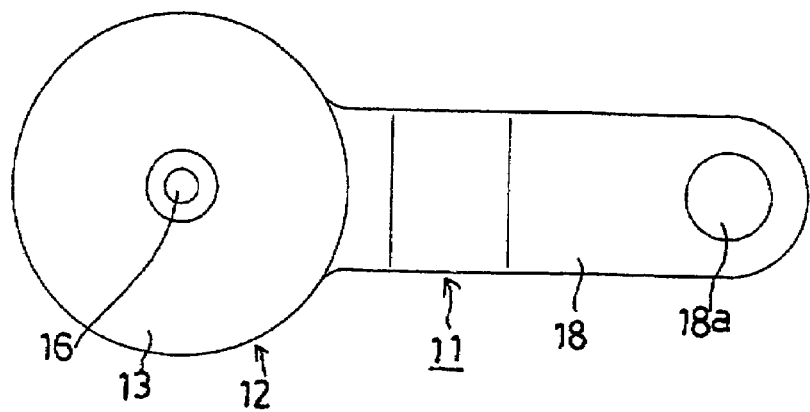
FIG. 4 is a bottom view of the case shown in FIG. 2.
Figure 5:
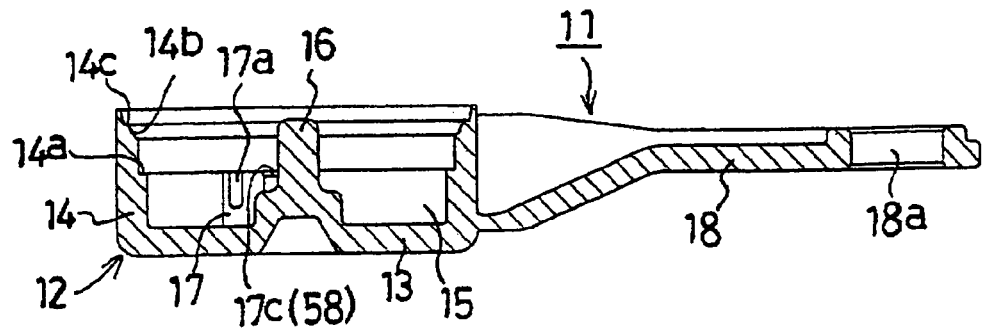
FIG. 5 is a cross sectional view taken along line 5-5 in FIG. 2.
Figure 6:
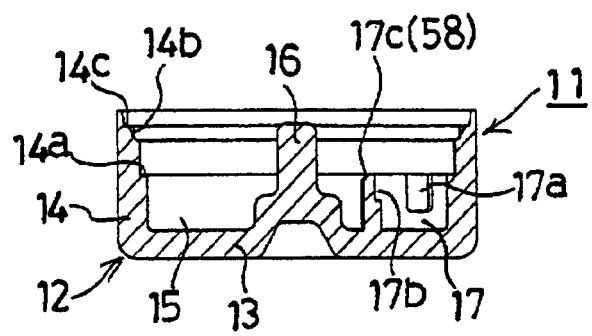
FIG. 6 is a cross sectional view taken along line 6-6 in FIG. 2.

FIG. 2 is a plan view of the case shown in FIG. 1; FIG. 3 is a front view of the case shown in FIG. 2; FIG. 4 is a bottom view of the case shown in FIG. 2; FIG. 5 is a cross sectional view taken along a line 5-5 in FIG. 2; and FIG. 6 is a cross sectional view taken along a line 6-6 in FIG. 2.

As shown in FIGS. 2 to 6, the case 11 is composed of: a case main body 12 having a cylindrical wall portion 14 formed around an outer edge of a bottom portion 13 having a circular planar shape; an axial supporting portion 16 with a column shape provided at a center of a bottom surface of the bottom portion 13; two second rotational wings 17 disposed on the bottom surface of the bottom portion 13 at symmetric positions relative to the axial supporting portion 16 and extending in an axial direction of the axial supporting portion 16 (axial direction of the axis portion 52 of the rotor 51) with a predetermined distance from the axial supporting portion 16 and in a radial direction to the cylindrical wall portion 14; and an arm portion 18 provided on an outer circumference of the case main body 12 in a radial direction.

On an upper side of an inner circumference of the cylindrical wall portion 14, there are provided a lower expanded diameter step 14a; a conical portion 14b expanding upwardly from an upper end of the lower expanded diameter step 14a; and an upper expanded diameter step 14c extending from an upper end of the conical portion 14b.

The second rotational wings 17 function as wall portions projecting toward the axis portion 52 of the rotor 51. The second rotational wings 17 include: notches 17a as second viscous-fluid passages for passing the silicone oil 41; and axis-supporting notches 17b for attaching the second valves 31 that open the notches 17a when the rotor 51 rotates in one direction (clockwise in FIG. 2) and block the notches 17a when the rotor 51 rotates in the other direction (counter-clockwise in FIG. 2).

Each of the second rotational wings 17 has a horizontal height such that a lower surface of the flange portion 53 of the rotor 51 slides and contacts. An upper end of the second rotational wing 17 on the inner circumferential side is a conical surface 17c inclined toward the center. An attachment hole 18a is formed at an end of the arm portion 18. The housing portion 15 is formed inside the case main body 12 (housing) for retaining the silicone oil 41, and corresponds to a space formed by the case 11 and the cap 21. When the rotor 51 is disposed inside the housing, the housing portion 15 is divided by the first rotational wings 54 of the rotor 51 and the second rotational wings 17.

Figure 7:
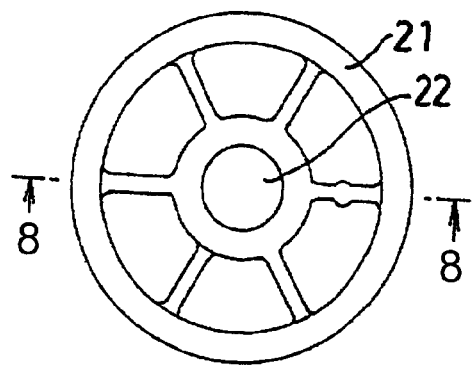
FIG. 7 is a plan view of a cap shown in FIG. 1.
Figure 8:
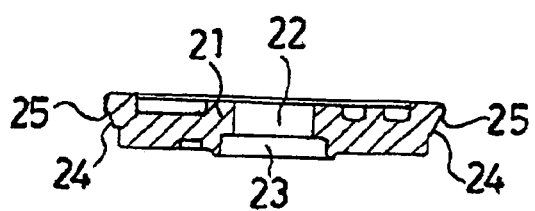
FIG. 8 is a cross sectional view taken along line 8-8 in FIG. 7.

FIG. 7 is a plan view of the cap shown in FIG. 1; and FIG. 8 is a cross sectional view taken along a line 8-8 in FIG. 7. As shown in FIGS. 7 and 8, the cap 21 includes: a penetrating hole 22 at a center thereof for inserting the axis portion 52 of the rotor 51; an expanded diameter step 23 disposed below the penetrating hole 22 and formed in a tube shape extending to a lower end thereof for retaining the O-ring 71; a conical portion 24 formed on an outer edge thereof and expanding upwardly to abut against the conical portion 14b of the case main body 12; and an upper expanded diameter step 25 extending from an upper end of the conical portion 24 and abutting against the upper expanded diameter step 14c of the case main body 12.

Figure 9:
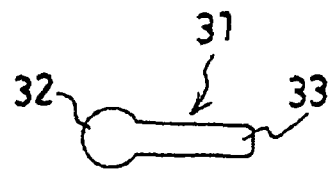
FIG. 9 is a plan view of a second valve shown in FIG. 1.
Figure 10:
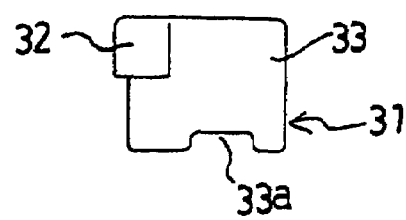
FIG. 10 is a front view of the second valve shown in FIG. 9.
Figure 11:
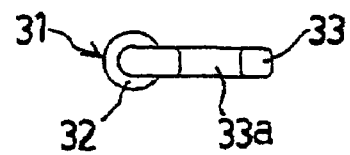
FIG. 11 is a bottom view of the second valve shown in FIG. 9.

FIG. 9 is a plan view of the second valve shown in FIG. 1; FIG. 10 is a front view of the second valve shown in FIG. 9; and FIG. 11 is a bottom plan view of the second valve shown in FIG. 9. As shown in FIGS. 9 to 11, the second valve 31 is composed of: an axis portion 32 to be rotatably inserted into the axis-supporting notch 17b of the case 11; and a valve portion 33 extending from the axis portion 32 for opening and closing the notch 17a of the case 11. A notch 33a is formed under the valve portion 33, and has a size overlapping the notch 17a of the case 11 without forming an opening.

Figure 12:
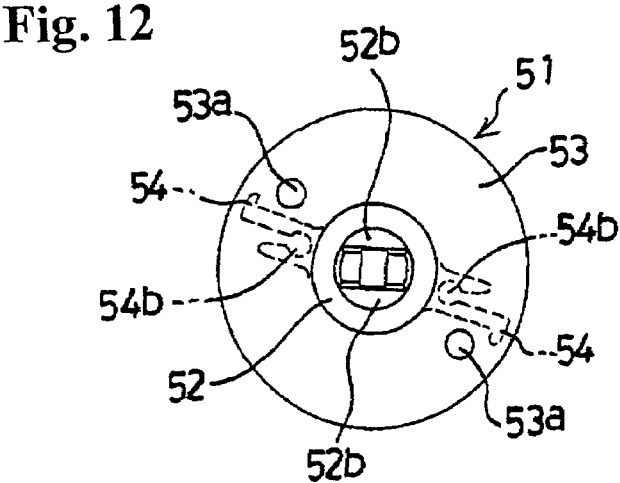
FIG. 12 is a plan view of a rotor shown in FIG. 1.
Figure 13:
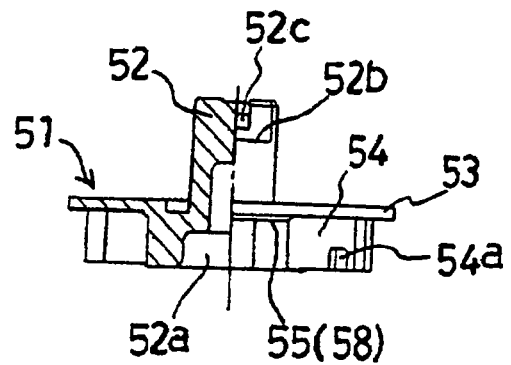
FIG. 13 is a front view of the rotor shown in FIG. 12, wherein a left half side thereof is a cross sectional view thereof.
Figure 14:
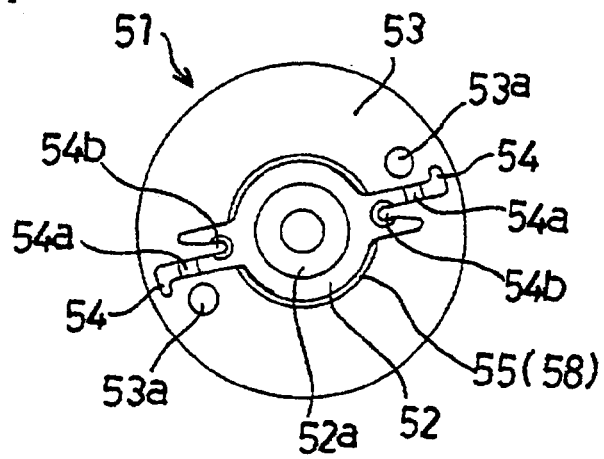
FIG. 14 is a bottom view of the rotor shown in FIG. 12.

FIG. 12 is a plan view of the rotor shown in FIG. 1; FIG. 13 is a front view with a left half cross section of the rotor shown in FIG. 12; and FIG. 14 is a bottom view of the rotor shown in FIG. 12. As shown in FIGS. 12 to 14, the rotor 51 is composed of: a axis portion 52 with a column shape; a flange portion 53 formed on an outer circumference of the axis portion 52 and having a circular shape in a plan view with the axis portion 52 as a center; and first rotational wings 54 extending from an outer circumference of the axis portion 52 in a radial direction (in a direction of a radius) and formed on a lower face of the flange portion 53 at symmetric positions relative to the axis portion 52 for dividing the housing portion 15 of the case 11.

The axis portion 52 includes a cylindrical depression 52a on a bottom surface thereof for engaging the axial supporting portion 16 of the case 11 to be rotatable: I-cut steps 52b with an I-shape formed on a part of the cap 21 projecting from the penetrating hole 22; and fitting grooves 52c formed in an I-cut flat portion (vertical surface) and extending in a horizontal direction. The flange portion 53 has two holes 53a on a circle concentric with the axis portion 52 at 180 degree intervals. The flange portion 53 is formed in a disc shape for sealing the cylindrical wall portion 14 between a section (A) and a section (B) of the silicone oil 41 and the O-ring 71, so that a pressure is not directly applied to the O-ring 71 when the section (A) is compressed to generate torque.

When the rotor 51 rotates in a direction to generate the torque (clockwise in FIG. 31), a positive pressure is generated in the section (A) due to a large compressive force. The holes 53a are formed in the flange portion 53 of the rotor 51 as a passage for releasing the silicone oil 41 at positions corresponding to the section (B) where a negative-pressure is generated when the rotor rotates to generate the torque. Accordingly, if the silicone oil 41 leaks between the cap 21 and the flange portion 53, the silicone oil 41 between the cap 21 and the flange portion 53 moves to the section (B) through the holes 53a with the negative pressure. Therefore, the cap 21 does not deform in a state wherein the silicone oil 41 leaks between the cap 21 and the flange portion 53. Also, the O-ring 71 does not receive a load. Accordingly, the silicone oil 41 does not leak through the housing of the rotor 51, thereby improving durability.

The first rotational wing 54 includes a notch 54a as a first viscous-fluid passage for passing the silicone oil 41; and an axis-supporting notch 54b for attaching a first valve 61 that opens the notch 54a when the rotor 51 rotates in one direction (clockwise in FIG. 12) and blocks the notch 54a when the rotor 51 rotates in the other direction (counter-clockwise in FIG. 12). A conical surface 55 inclined downwardly is formed below a joint part between the axis portion 52 and the flange portion 53, i.e. a portion facing the conical surface 17c of the case 11. A passage 58 is formed between the conical surface 55 and the conical surface 17c of the case 11 for passing the silicone oil 41 in a compressed (pressurized) state.

Figure 15:
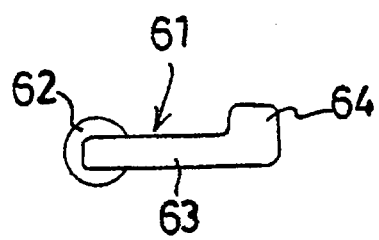
FIG. 15 is a plan view of a first valve shown in FIG. 1.
Figure 16:
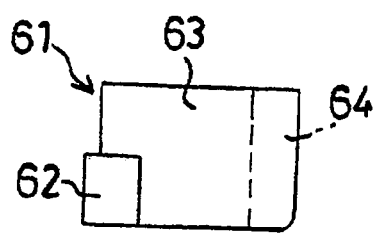
FIG. 16 is a front view of the first valve shown in FIG. 15.
Figure 17:
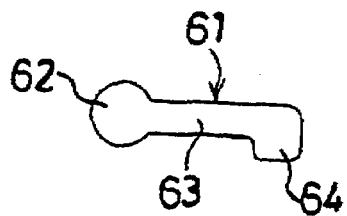
FIG. 17 is a bottom plan view of the first valve shown in FIG. 15.
Figure 18:
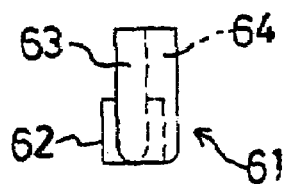
FIG. 18 is a right side view of the first valve shown in FIG. 15.

FIG. 15 is a plan view of the first valve shown in FIG. 1; FIG. 16 is a front view of the first valve shown in FIG. 15; FIG. 17 is a bottom view of the first valve shown in FIG. 15; and FIG. 18 is a right face view of the first valve shown in FIG. 15. As shown in FIGS. 15 to 18, the first valve 61 is composed of: an axis portion 62 to be pressed into the axis-supporting notch 54b of the rotor 51; a valve portion 63 extending from the axis portion 62 for opening and closing the notch 54a of the rotor 51; and a projecting portion 64 extending upwardly and downwardly from an edge of the valve portion 63 for effectively receiving a pressure of the silicone oil 41 in a compressed (pressurized) state so that the valve portion 63 blocks the notch 54a.

Figure 19:
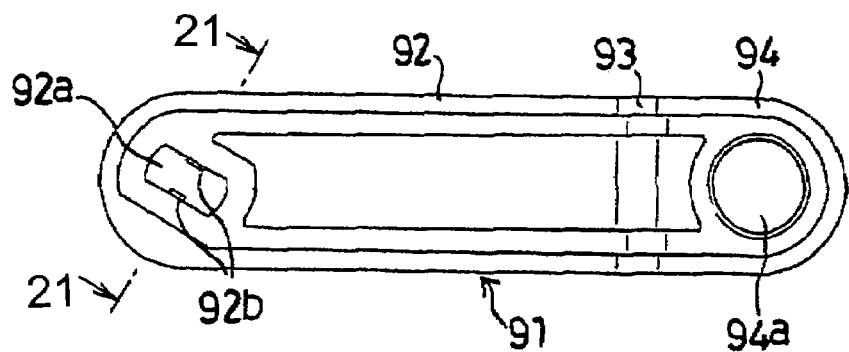
FIG. 19 is a plan view of an arm shown in FIG. 1.
Figure 20:
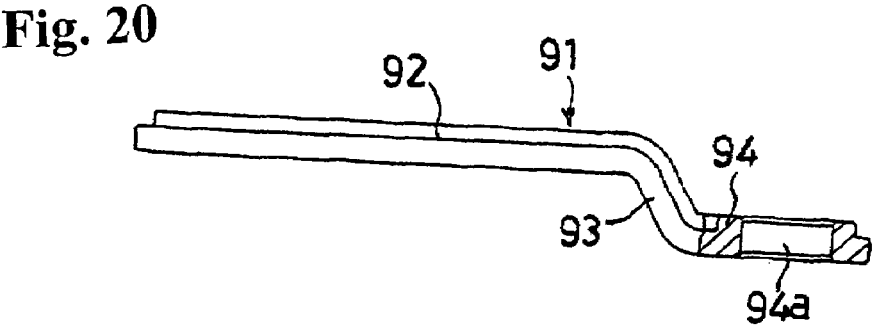
FIG. 20 is a partially sectional front view of the arm shown in FIG. 19.
Figure 21:
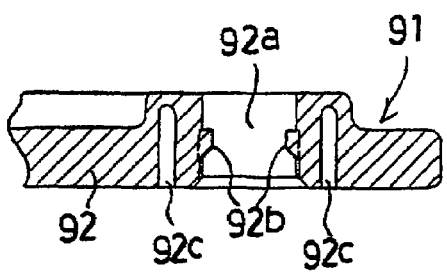
FIG. 21 is an enlarged sectional view taken along line 21-21 in FIG. 19.

FIG. 19 is a plan view of the arm shown in FIG. 1; FIG. 20 is a partial sectional front view of the arm shown in FIG. 19; and FIG. 21 is an enlarged sectional view taken along a line 21-21 in FIG. 19. As shown in FIGS. 19 to 21, the arm 91 is composed of: a first horizontal portion 92; a declining portion 93 extending from a right edge of the horizontal portion 92; and a second horizontal portion 94 extending from a right edge of the declining portion 93. The portions 92 to 94 are connected in a line in a plan view.

The first horizontal portion 92 includes: an I-cut attachment hole 92a provided at a center of an arc on a left end thereof; fitting projections 92b provided on vertical surfaces of the attachment hole 92a for engaging the fitting grooves 52c provided on the axis portion 52 of the rotor 51; and grooves 92c provided outside the fitting projections 92 so that the fitting projection 92 can slightly move back and forth. A circular attachment hole 94a is provided at a center of an arc on a right end of the second horizontal portion 94.

A process of assembling the damper device D will be described next. First, the axis portions 32 of the second valves 31 are inserted respectively into the two axis-supporting notches 17b of the case 11 to be rotatable. The axis portions 62 of the first valves 61 are respectively pressed into the axis-supporting notches 54b of the rotor 51. An appropriate amount of the silicone oil 41 is filled in the housing portion 15. Further, the silicone oil 41 is applied to the depression 52a of the rotor 51, the lower side of the axis portion 52, and the flange portion 53. Then, the axial supporting portion 16 of the case 11 is fitted into the depression 52a, so that a part of the axis portion 52 and the flange portion 53 are disposed inside the housing portion 15.

When the part of the axis portion 52 and the flange portion 53 are disposed inside the housing portion 15 filled with the silicone oil 41, air at the lower side of the flange portion 53 (inside the housing portion 15) is discharged upwardly through the holes 53a provided in the flange portion 53, and the silicone oil 41 is slightly overflowed above the flange portion 53 through the holes 53a. Accordingly, air does not stay at the lower side of the flange portion 53 (inside the housing portion 15), thereby minimizing a variation in the braking torque due to air mixed in the housing portion 15.

The axis portion 52 of the rotor 51 is fitted into the O-ring 71, and the ring-shaped sheet 81 is placed around the outer edge of the flange portion 53. Then, the axis portion 52 of the rotor 51 is inserted into the penetrating hole 22 of the cap 21, and the O-ring 71 is pressed into the expanded diameter step 23. The conical portion 24 of the cap 21 abuts against the conical portion 14b of the case 11, and the upper expanded diameter step 25 abuts against the upper expanded diameter step 14c, so that the cap 21 closes the opening of the case 11.

When the opening of the case 11 is closed by the cap 21, air at an upper side of the flange portion 53 is discharged outside the housing. The flange portion 53 contacts the cap 21 through the silicone oil 41 and the ring-shaped sheet 81, so that the O-ring 71 inside the expanded diameter step 23 prevents the silicone oil 41 from leaking between the cap 21 and the axis portion 52.

An upper inside edge of the case 11 is welded and sealed hermetically to an outer edge of the cap 21 with high-frequency welding. When the axis portion 52 of the rotor 51 projecting from the cap 21 is pressed into the attachment hole 92a of the arm 91, the fitting projections 92b are fitted into the fitting grooves 52c, thereby assembling the damper device D as shown in FIGS. 22 to 30. When the damper device D is assembled, the first valves 61 elastically contact the inner surface of the housing, i.e. the bottom and inner circumferential surfaces of the case 11 and the lower surface of the cap 21, so that the first valves 61 securely divide the housing portion 15.

Figure 31:
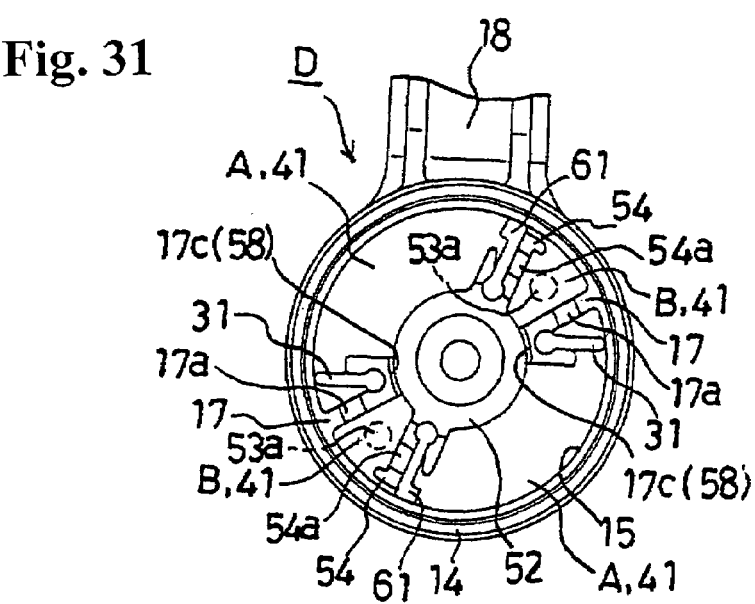
FIG. 31 is an explanatory drawing showing an operation of the damper device according to the second embodiment of the present invention.

An operation of the damper device according to the embodiment of the present invention will be described with reference to FIGS. 31 to 34. In the damper device D, the case 11 is attached to an opening of a main body of a device through the arm portion 18 in a vertical direction, and the arm 91 is attached to a cover member for opening and closing the opening of the main body through the second horizontal portion 94. FIG. 31 shows a state wherein the cover member is closed, and FIG. 34 shows a state wherein the cover member is open.

Figure 22:
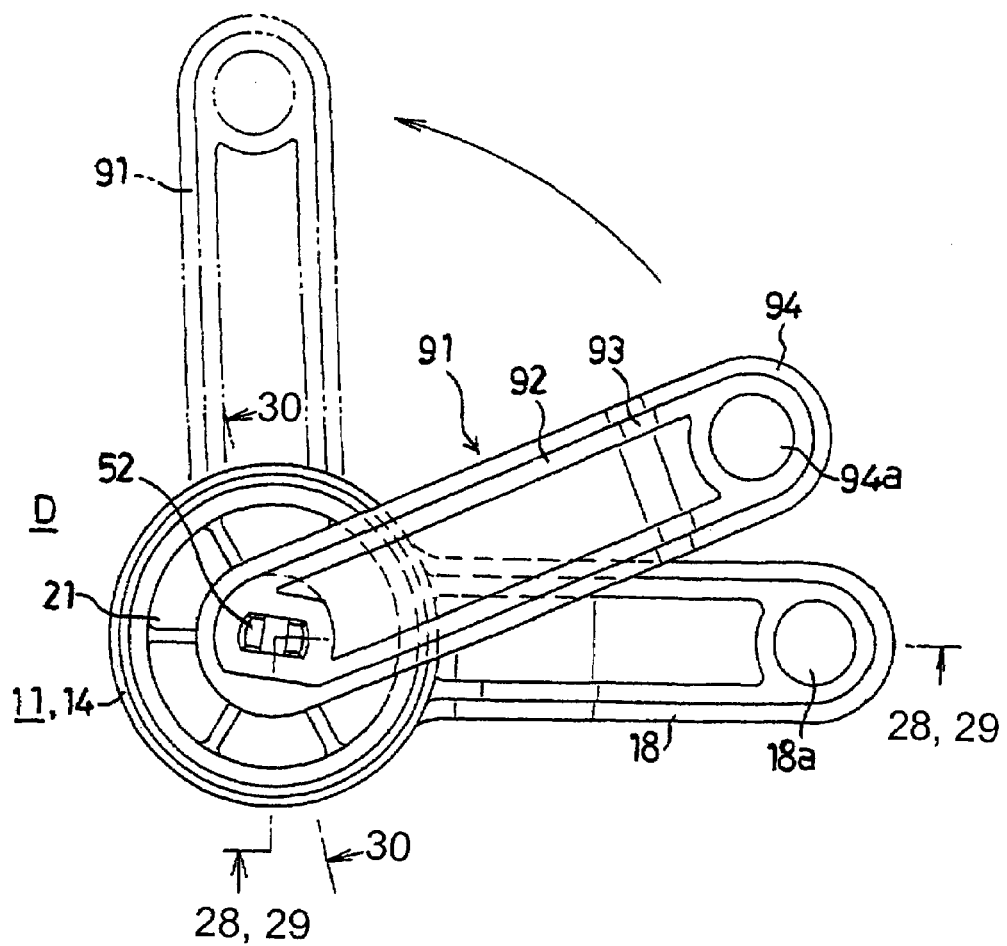
FIG. 22 is a plan view of a damper device according to the embodiment of the present invention.
Figure 23:
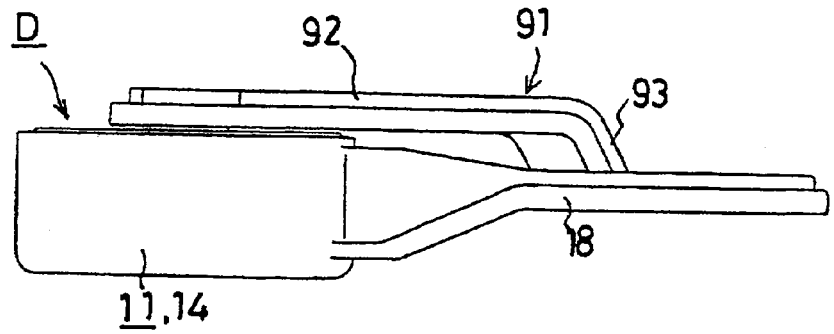
FIG. 23 is a front view of the damper device according to the embodiment of the present invention.
Figure 24:
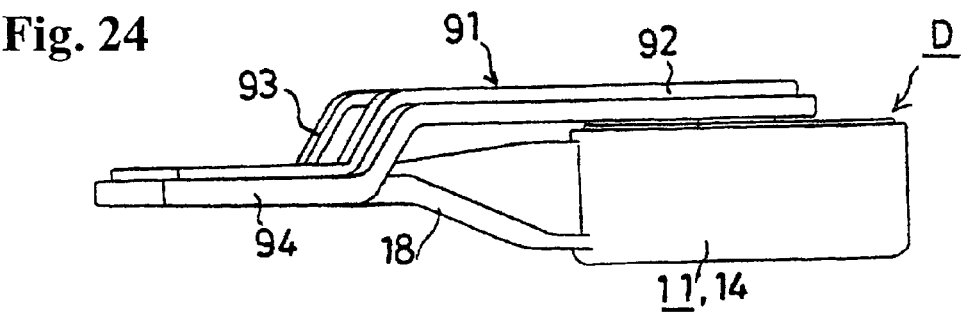
FIG. 24 is a rear view of the damper device according to the embodiment of the present invention.
Figure 25:
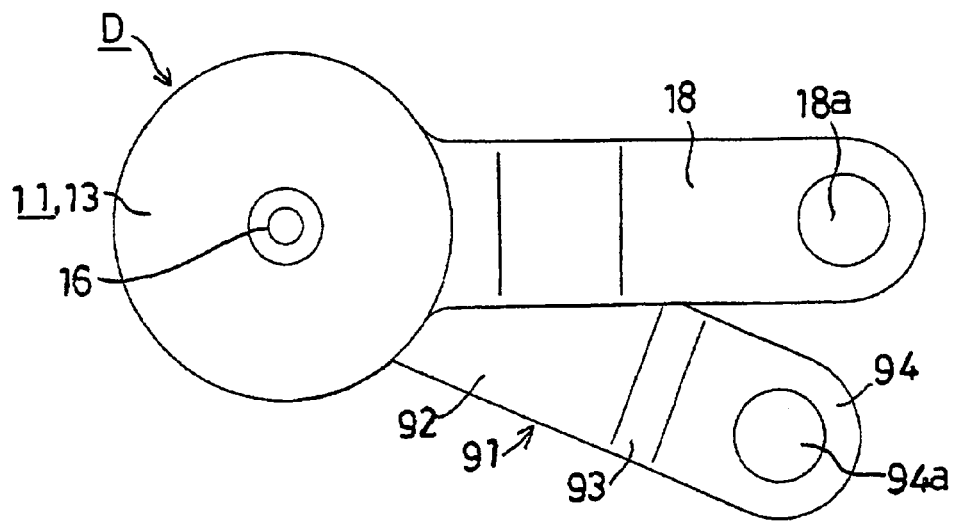
FIG. 25 is a bottom view of the damper device according to the embodiment of the present invention.
Figure 26:
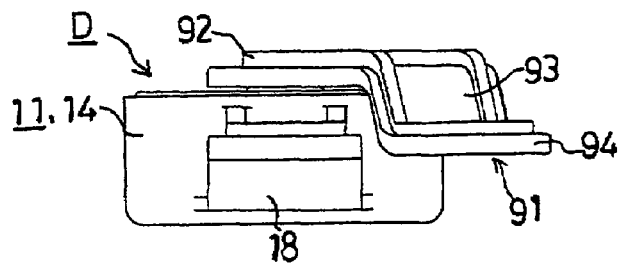
FIG. 26 is a right side view of the damper device according to the embodiment of the present invention.
Figure 27:
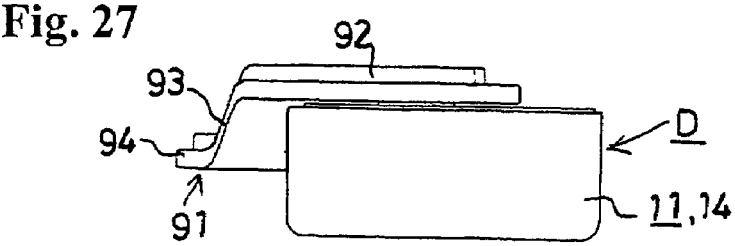
FIG. 27 is a left side view of the damper device according to the embodiment of the present invention.
Figure 28:
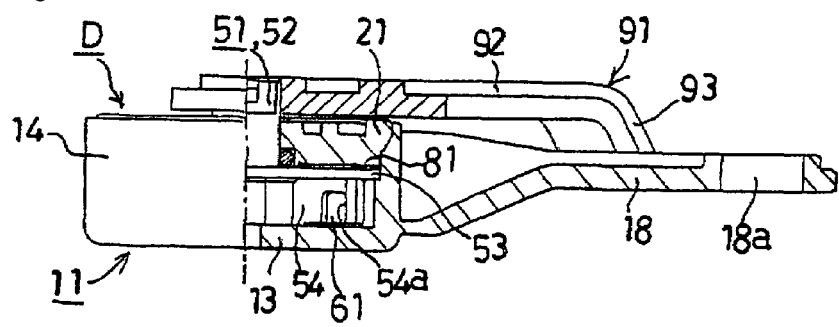
FIG. 28 is a partial sectional view taken along line 28, 29-28, 29 in FIG. 22.
Figure 29:
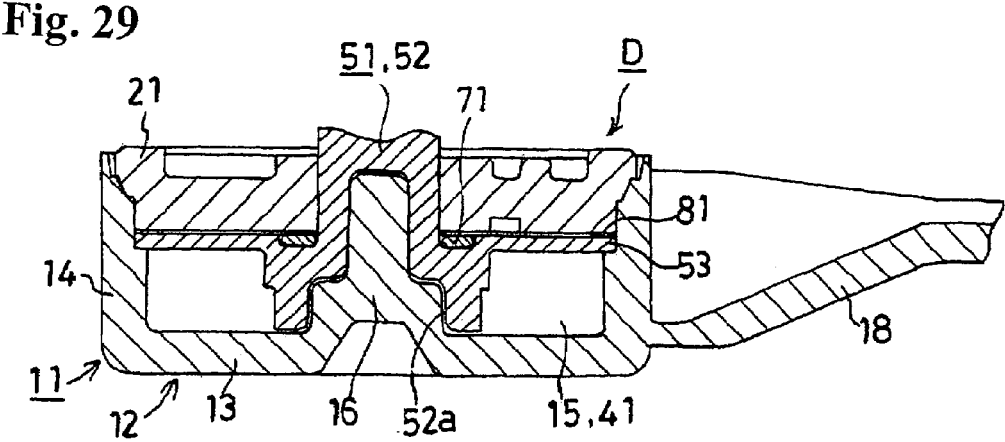
FIG. 29 is a partial sectional view taken along the line 28, 29-28, 29 in FIG. 22.
Figure 32:
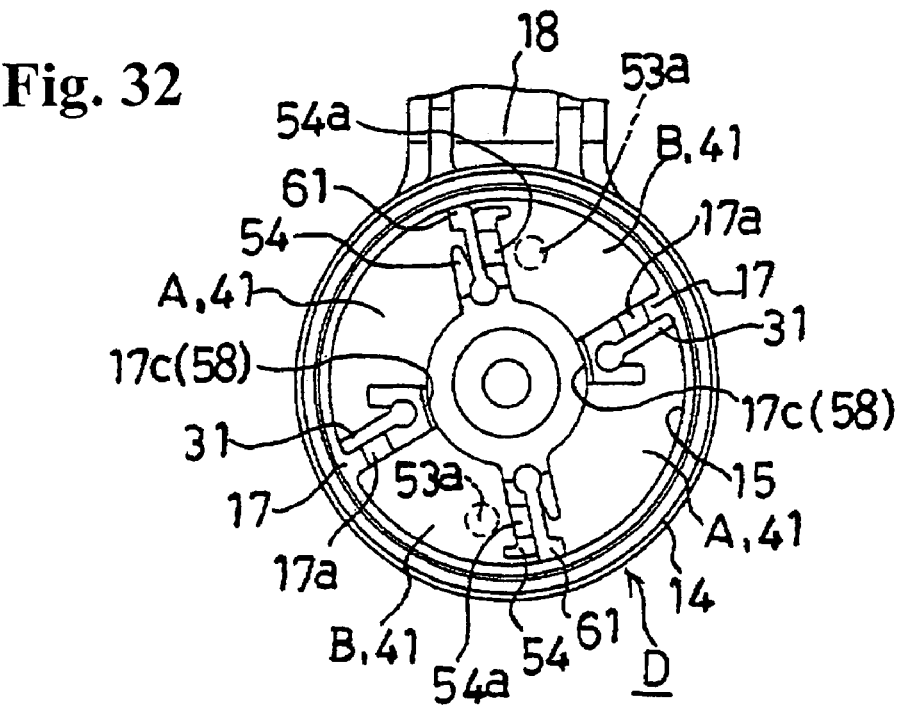
FIG. 32 is an explanatory drawing showing the operation of the damper device of the embodiment according to the present invention.

In a state wherein the cover member closes the opening of the main body shown in FIG. 31, the arm 91 is rotated counterclockwise as indicated by an arrow in FIG. 22 to release a lock mechanism (not shown) and open the cover member. Accordingly, the rotor 51 connected to the cover member through the arm 91 is rotated counterclockwise, so that the silicone oil 41 in the section A of the housing portion 15 between the first valves 61 and the second valves 31 is compressed. As a result, as shown in FIG. 32, the first valves 61 block the notches 54a of the first rotational wings 54 provided on the rotor 51 due to the pressure of the silicone oil 41 inside the section A. Also, the second valves 31 block the notches 17a of the second rotational wings 17 provided on the case 11 due to the pressure of the silicone oil 41 inside the section A.

Figure 30:
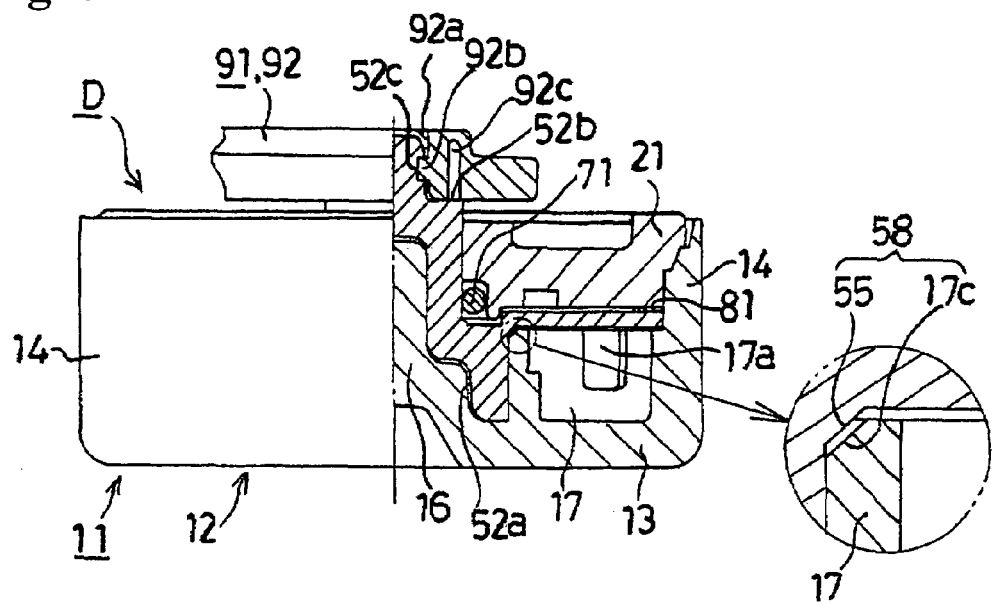
FIG. 30 is an enlarged sectional view taken along line 30-30 in FIG. 22.

Accordingly, the first valves 61 and second valves 31 block the notches 54a and 17a to prevent the silicone oil 41 inside the section A from easily flowing out from the section A, thereby damping the cover member rotating in the opening direction. As shown in FIG. 30, the compressed silicone oil 41 inside the section A flows into the section B inside the housing portion 15 through the passage 58. The conical surfaces 17c of the second rotational wings 17 and the conical surface 55 of the rotor 51 forming the passage 58 include surfaces perpendicular to the rotational axis line of the rotor 51. That is, the conical surfaces 17c and 55 include the surfaces perpendicular to the rotational axis line of the rotor 51 and the surfaces parallel to the rotational axis line of the rotor 51. Accordingly, when the compressed silicone oil 41 passes through the passage 58, the silicone oil 41 pushes the bottom of the case 11 away from the rotor 51 due to the surfaces of the conical surfaces 17c and 55 perpendicular to the rotational axis line of the rotor 51 (orthogonal component face). As a result, while the passage 58 tries to expand, it is possible to maintain a gap of the passage 58 constant due to rigidity of the housing, thereby maintaining accuracy of the braking torque.

Figure 33:
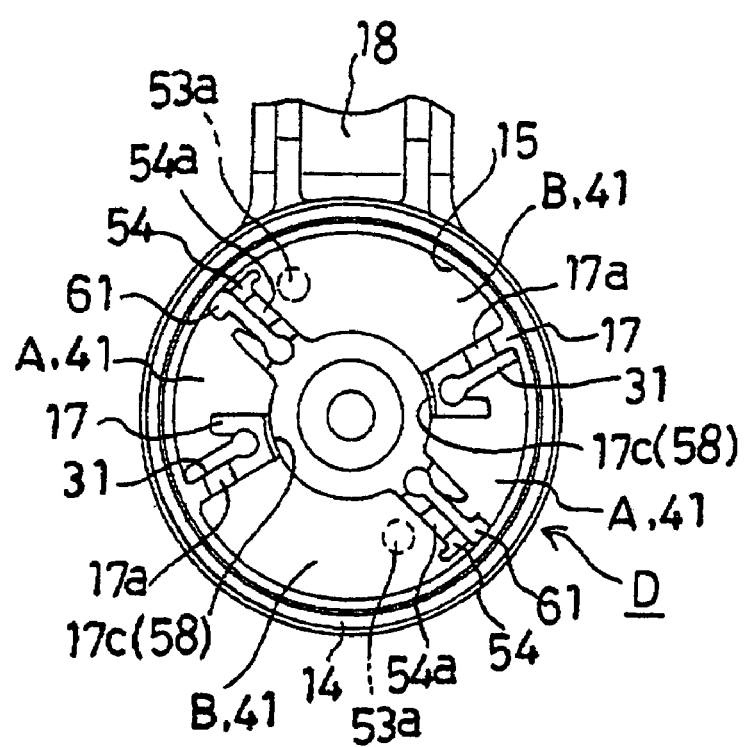
FIG. 33 is an explanatory drawing showing the operation of the damper device of the embodiment according to the present invention.
Figure 34:
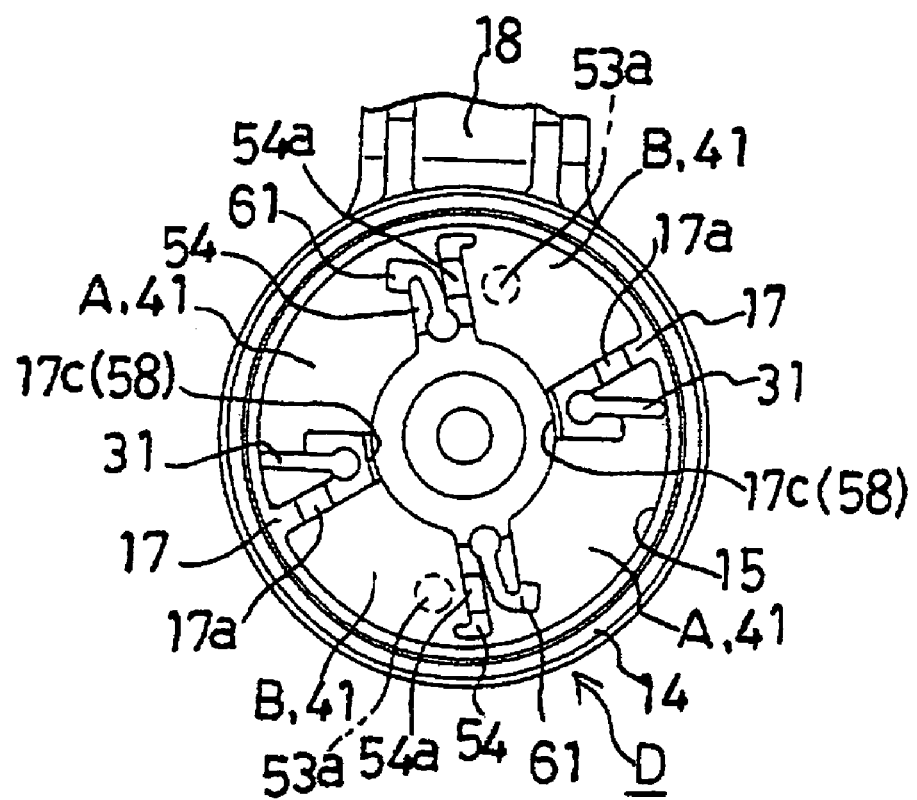
FIG. 34 is an explanatory drawing showing the operation of the damper device of the embodiment according to the present invention.

When the cover member is turned to the open position until abuts against a stopper (not shown), the damper gear D stops in the state shown in FIG. 33. In this state, when the cover member is turned to close the opening of the main body and the arm 91 is turned clockwise opposite to the arrow shown in FIG. 22, the silicone oil 41 inside the section A is not compressed and the silicone oil 41 inside the section B is compressed. As a result, as shown in FIG. 34, the first valves 61 open the notches 54a of the first rotational wings 54 by the pressure of the compressed silicone oil 41 inside the section B. The second valves 31 open the notches 17a of the second rotational wings 17 by the pressure of the compressed silicone oil 41 inside the section B.

Accordingly, the silicone oil 41 moves (flows) from the section B to the section A through the notches 54a of the first rotational wings 54; between the first rotational wings 54 and the cylindrical wall portion 14, the notches 17a of the second rotational wings 17, and the notches 33a of the valve portions 33, so that the cover member rotates in the closing direction without damping.

As described above, in the embodiment of the present invention, the first rotational wings 54 with the notches 54a are provided on the rotor 51. The rotational wings 54 move relative to the silicone oil 41 in the circumferential direction, and extend in a radial direction for dividing the housing portion 15 of the housing filled with the silicone oil 41. The first valves 61 are provided on the rotational wings 54, and are formed of the elastic member capable of deforming elastically. The first valves 61 open the notches 54a when the rotor 51 rotates in one direction, and block the notches 54a when the rotor 51 rotates in the other direction. Accordingly, the first valves 61 reliably block the notches 54a when the braking torque is generated. As a result, the silicone oil 41 passes only through the passage 58, thereby obtaining the braking torque with constant accuracy.

The first valves 61 elastically contact at least the inner face of the housing and the outer surface of the rotor 51. Accordingly, the silicone oil 41 passes only through the passage 58, thereby improving accuracy of the braking torque. Moreover, the first valves 61 are formed of ethylene-propylene-diene rubber with a non-swelling property relative to the silicone oil 41. Accordingly, it is possible to smoothly operate the first valves regardless of a temperature change, thereby making it possible to use the damper device in cold climate without problem.

Further, the wall portion (second rotational wings 17) projecting toward the axial portion 52 of the rotor 51 is provided on the housing. The passage 58 is formed between the surface of the wall portion having the surface perpendicular to the rotational axis line of the rotor 51 and the surface 55 of the rotor 51 having the surface perpendicular to the rotational axis line and facing the surface of the wall portion for passing the silicone oil 41 therethrough. When the braking torque is generated, the passage 58 tries to expand due to a pressure of the silicone oil 41 passing through the passage 58. With the structure described above, it is possible to maintain the gap of the passage 58 constant through rigidity of the housing, thereby obtaining the braking torque with constant accuracy. Also, the housing and the rotor 51 forming the passage 58 have rigidity, thereby improving durability of the damper device D.

Further, the second valves 31 are provided on the second rotational wings 17 for opening the notches 17a when the rotor 51 rotates in one direction and blocking the notches 17a when the rotor 51 rotates in the other direction. Accordingly, the compressed silicone oil 41 passes through at least the notches 17a and 54a not to generated the breaking torque, thereby effectively reducing the breaking torque when the braking torque is not generated. Also, the second valves 31 are provided for reducing a load to the first valves 61, thereby improving durability of the first valves 61 and the damper device D.

The ring-shaped sheet 81 is placed between the cap 21 and the flange portion 53 of the rotor 51. Accordingly, the silicone oil 41 does not pass between the cap 21 and the rotor 51 during the initial operation, thereby eliminating frictional resistance between the cap 21 and the rotor 51.

In the embodiment described above, the second valves 31 are made of a synthetic resin, and may be made of an elastic member. The silicone oil 41 is used as the viscous fluid, and other viscous fluids with a same function such as grease may be used.

In the embodiment, the second rotational wings 17 are provided on the housing, and the second valves 31 are provided on the second rotational wings 17. The first rotational wings 54 are provided on the rotor 51, and the first valves 61 are provided on the first rotational wings 54. Alternatively, the first rotational wings may be provided on the housing, and the first valves may be provided on the first rotational wings. The second rotational wings may be provided on the rotor, and the second valves may be provided on the second rotational wings. With such a structure, the same effect still can be achieved.

As described above, the first rotational wings may be provided on the housing, and the first valves may be provided on the first rotational wings; and also the second rotational wings may be provided on the rotor, and the second valves may be provided on the second rotational wings. In such a case, the both valves may be pressed into the rotational wings, so that the valves do not come off, thereby making the assembly easy and assembling the damper device D efficiently. The viscous-fluid passage is formed of the notches 17a and 54a, and may be formed of a hole for reliably opening and closing the viscous-fluid passage.

Further, the axis portion 52 of the rotor 51 projects from the housing. Alternatively, a fitting concave may be provided in the axis portion of the rotor exposed from the housing without projecting the axis portion of the rotor from the housing. A connecting member may be fitted into the fitting concave, so that the rotor can rotate relative to the housing. The passage 58 is formed of the conical surfaces 17c and 55, and may be formed of only the orthogonal surfaces perpendicular to the rotational axis line of the rotor 51. The second valves 61 are formed of the non-elastic member, and the same effect can be achieved when the second valves are formed of an elastic member.

The O-ring 71 is made of self-lubricating silicone rubber, and may be made of ethylene-propylene-diene rubber with non-swelling property relative to the silicone oil 41. Accordingly, it is possible to reduce a variation in the braking torque due to a temperature change and use the O-ring 71 in cold climate without any problem. In the embodiment, the housing is composed of the case 11 and the cap 21. The housing portion 15 of the silicone oil 41 is provided on the case 11. The penetrating hole 22 for inserting the axis portion 52 of the rotor 51 is provided in the cap 21. The O-ring 71 prevents the silicone oil 41 from leaking between the cap 21 and the axis portion 52. Alternatively, the housing portion may be provided in the cap for retaining the silicone oil, and the penetrating hole may be provided in the case for inserting the axis portion of the rotor penetrates, so that the O-ring can prevent the silicone oil from leaking between the case and the axis portion.

The disclosures of Japanese Patent Applications No. 2003-378982 filed on Nov. 7, 2003 and No. 2003-378983 filed on Nov. 7, 2003 are incorporated in the application.

While the invention has been explained with reference to the specific embodiment of the invention, the explanation is illustrative and the invention is limited only by the appended claims.

What is claimed is:

1. A damper device comprising:
   a housing,
   a viscous fluid filled in the housing,
   a rotor rotatably disposed inside the housing,
   a sealing member disposed between the housing and the rotor for preventing the viscous fluid from leaking therebetween,
   a rotational wing device with a viscous-fluid passage device provided on one of the housing and the rotor, said rotational wing device moving relative to the viscous fluid in a circumferential direction and extending in a radial direction for dividing the housing, and
   a valve device provided on the rotational wing device, said valve opening the viscous-fluid passage device when the rotor rotates in one direction and blocking the viscous-fluid passage device when the rotor rotates in the other direction,
   wherein said valve device is formed of an elastic member capable of deforming elastically and includes an axis portion at one side thereof so that the valve device rotates around the axis portion when the rotor rotates.

2. A damper device according to claim 1, wherein said valve device elastically contacts an inner surface of the housing.

3. A damper device according to claim 1, wherein said viscous fluid is formed of silicone oil, and said valve device is formed of ethylene-propylene-diene rubber having non-swelling property relative to the silicone oil.

4. A damper device according to claim 1, wherein said housing further includes a wall portion projecting toward the rotor so that a passage is formed between the wall portion and the rotor for passing the viscous fluid therethrough.

5. A damper device comprising:
a housing,
a viscous fluid filled in the housing,
a rotor rotatably disposed inside the housing,
a sealing member disposed between the housing and the rotor for preventing the viscous fluid from leaking therebetween,
a rotational wing device with a viscous-fluid passage device provided on one of the housing and the rotor, said rotational wing device moving relative to the viscous fluid in a circumferential direction and extending in a radial direction for dividing the housing, and
a valve device provided on the rotational wing device, said valve opening the viscous-fluid passage device when the rotor rotates in one direction and blocking the viscous-fluid passage device when the rotor rotates in the other direction,
wherein said rotational wing device includes a first rotational wing with a first viscous-fluid passage provided on one of the housing and the rotor, and a second rotational wing with a second viscous-fluid passage provided on the other of the housing and the rotor; and said valve device includes a first valve provided on the first rotational wing for opening and closing the first viscous-fluid passage, and a second valve provided on the second rotational wing for opening and closing the second viscous-fluid passage.

6. A damper device according to claim 5, wherein said second rotational wing is provided on said housing to project toward the rotor so that a passage is formed between the first rotational wing and the rotor for passing the viscous fluid therethrough.

7. A damper device according to claim 5, wherein said valve device is formed of an elastic member capable of deforming elastically.

8. A damper device according to claim 5, wherein said first and second valves elastically contacts an inner surface of the housing.

9. A damper device according to claim 5, wherein said viscous fluid is formed of silicone oil, and said first and second valves are formed of ethylene-propylene-diene rubber having non-swelling swelling property relative to the silicone oil.

10. A damper device according to claim 5, wherein each of said first and second valves includes a valve portion and an axis portion at one side of the valve portion so that the valve device rotates around the axis portion when the rotor rotates.

11. A damper device according to claim 5, wherein said first and second valves are provided on the first and second rotational wings such that when the rotor is rotated in a direction so that the first and second rotational wings approach each other, the first and second valves close the first and second viscous-fluid passages, and when the rotor is rotated in a direction so that the first and second rotational wings move away from each other, the first and second valves open the first and second viscous-fluid passages.

* * * * *